(12) United States Patent
Sproch

(10) Patent No.: US 12,443,216 B2
(45) Date of Patent: *Oct. 14, 2025

(54) GENERATION OF CLOCK WAVEFORMS BASED ON DECODED INSTRUCTIONS FOR MORE EFFICIENT POWER MANAGEMENT IN HIGH-SPEED PROCESSORS

(71) Applicant: Groq, Inc., Mountain View, CA (US)

(72) Inventor: James David Sproch, Monte Sereno, CA (US)

(73) Assignee: Groq, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/323,188

(22) Filed: May 24, 2023

(65) Prior Publication Data

US 2024/0385641 A1    Nov. 21, 2024

Related U.S. Application Data

(60) Provisional application No. 63/502,567, filed on May 16, 2023.

(51) Int. Cl.
*G06F 1/08* (2006.01)

(52) U.S. Cl.
CPC ..................... *G06F 1/08* (2013.01)

(58) Field of Classification Search
None
See application file for complete search history.

(56) References Cited

U.S. PATENT DOCUMENTS

| | | | | |
|---|---|---|---|---|
| 4,615,005 A | * | 9/1986 | Maejima | G06F 1/3203 |
| | | | | 712/E9.032 |
| 4,791,384 A | * | 12/1988 | Mackey | G06F 1/0321 |
| | | | | 708/272 |
| 5,930,275 A | * | 7/1999 | Horst | H03D 13/00 |
| | | | | 327/47 |
| 5,944,833 A | * | 8/1999 | Ugon | G07F 7/082 |
| | | | | 713/400 |
| 6,199,140 B1 | * | 3/2001 | Srinivasan | G11C 15/00 |
| | | | | 711/108 |
| 6,449,667 B1 | | 9/2002 | Ganmukhi et al. | |
| 9,606,602 B2 | | 3/2017 | Suryanarayanan et al. | |
| 10,114,449 B2 | | 10/2018 | Bertran et al. | |
| 10,241,798 B2 | | 3/2019 | Sommers et al. | |

(Continued)

OTHER PUBLICATIONS

Kumar et al., "A Fast Method to Predict the Voltage Droop for Fully Integrated Voltage Regulators in Microprocessors", IEEE Electrical Design of Advanced Packaging and Systems (EDAPS), 2021, 3 pages.

(Continued)

*Primary Examiner* — Danny Chan
(74) *Attorney, Agent, or Firm* — Dority & Manning, P.A.

(57) ABSTRACT

Clock period synthesis for fine-grain power management is provided. Methods are described for enabling clock waveform synthesis for, in some embodiments, tensor or graphical processors that enable shorter runtime latency, higher computational job throughput, more efficient power management, and a lower implementation cost than alternative clock waveform methods. This Abstract and the independent Claims are concise signifiers of embodiments of the claimed inventions. The Abstract does not limit the scope of the claimed inventions.

20 Claims, 11 Drawing Sheets

(56) References Cited

U.S. PATENT DOCUMENTS

| | | | |
|---|---|---|---|
| 10,552,250 B2 | 2/2020 | Biran et al. | |
| 10,824,188 B2 | 11/2020 | Thorson et al. | |
| 10,884,485 B2 | 1/2021 | Prasad | |
| 10,928,886 B2 | 2/2021 | Mosalikanti et al. | |
| 10,969,858 B2 | 4/2021 | Becker et al. | |
| 2002/0026596 A1* | 2/2002 | Kim | G06F 1/3203 712/E9.032 |
| 2005/0212571 A1* | 9/2005 | Om | G06F 1/08 327/143 |
| 2008/0284474 A1* | 11/2008 | Eaton | G06F 1/08 327/146 |
| 2011/0083030 A1* | 4/2011 | Doi | G06F 12/0864 713/601 |
| 2011/0264971 A1* | 10/2011 | Bahl | G01R 31/3177 714/E11.155 |
| 2014/0354446 A1 | 12/2014 | Nakayama et al. | |
| 2017/0177527 A1 | 6/2017 | Lovett et al. | |
| 2019/0020433 A1 | 1/2019 | Pitigoi-Aron | |
| 2020/0050251 A1* | 2/2020 | Naik | G06F 9/3869 |
| 2021/0081019 A1 | 3/2021 | Prasad | |
| 2023/0129113 A1 | 4/2023 | Dai et al. | |

OTHER PUBLICATIONS

Abts et al., "Think Fast: A Tensor Streaming Processor (TSP) for Accelerating Deep Learning Workloads", ACM/IEEE 47th Annual International Symposium on Computer Architecture, 2020, pp. 145-158.

Abts et al., "The Groq Software-defined Scale-out Tensor Streaming Multiprocessor", IEEE Hot Chips 34 Symposium, 2022, 69 pages.

Abts et al., "Challenges/Opportunities to Enable Dependable Scale-out System with Groq Deterministic Tensor-Streaming Processors", 52nd Annual IEEE/IFIP International Conference on Dependable Systems and Networks-Supplemental Volume (DSN-S), 2022, pp. 19-22.

Emani et al., "A Comprehensive Evaluation of Novel AI Accelerators for Deep Learning Workloads", IEEE/ACM International Workshop on Performance Modeling, Benchmarking and Simulation of High Performance Computer Systems, 2022, pp. 13-25.

International Search Report and Written Opinion received for PCT Application Serial No. PCT/US24/30440 dated Aug. 7, 2024, 19 pages.

* cited by examiner

GENERATION OF CLOCK WAVEFORMS BASED ON DECODED INSTRUCTIONS FOR MORE EFFICIENT POWER MANAGEMENT IN HIGH-SPEED PROCESSORS

CROSS REFERENCE TO RELATED APPLICATIONS

This application claims the benefit of priority to U.S. Provisional Application No. 63/502,567, filed May 16, 2023, and entitled "POWER MANAGEMENT OF POWER REGULATOR DURING HIGH CURRENT EVENTS," the entirety of which is expressly incorporated herein by reference.

COPYRIGHT NOTICE

This patent document can be exactly reproduced as it appears in the files of the United States Patent and Trademark Office, but the assignee(s) otherwise reserves all rights in any subsets of included original works of authorship in this document protected by 17 USC 102(a) of the U.S. copyright law.

SPECIFICATION—DISCLAIMERS

In the following Background, Summary, and Detailed Description, paragraph headings are signifiers that do not limit the scope of an embodiment of a claimed invention (ECIN). The citation or identification of any publication signifies neither relevance nor use as prior art. A paragraph for which the font is all italicized signifies text that exists in one or more patent specifications filed by the assignee(s).

A writing enclosed in double quotes (" ") signifies an exact copy of a writing that has been expressed as a work of authorship. Signifiers, such as a word or a phrase enclosed in single quotes (' '), signify a term that as of yet has not been defined and that has no meaning to be evaluated for, or has no meaning in that specific use (for example, when the quoted term 'module' is first used) until defined.

FIELD(S) OF TECHNOLOGY

This disclosure has general significance in the field of power management in processors, in particular, the synthesis of clock waveforms for more efficient power management in high-speed processors. This information is limited to use in the searching of the prior art.

BACKGROUND

The operating frequency of a computer processor's system clock fundamentally impacts key performance metrics such as latency, throughput, peak power, energy required to perform a computation, and the rate of change of power supply load current. Common methods of manipulating the frequency of the clock generator, such as setting the clock frequency of a processor to a particular value during execution of an entire algorithm, may lack sufficient granularity or responsiveness to fully optimize system performance metrics.

Integrated circuits, such as tensor and graphical processors, typically operate in several different modes such as high computational activity, low computational activity, and quiescent or sleep state. Overall system performance optimization requires different clock waveforms for each different mode, but dynamically changing the clock frequency has many limitations and incurs substantial implementation and operational costs, especially in the common situation where PLL techniques are incorporated in the clock generator. For example, clock frequency synthesis controllers often have coarse granularity and can provide only a relatively small number of discrete operating frequencies. The switchover mechanism must guarantee waveform integrity during all clock phases, so switching to a different frequency may take several clock cycles. Changing the PLL reference clock frequency or multiplier value may produce indeterminate waveforms for many cycles as the PLL attempts to lock in on new reference conditions. A clock waveform generator that overcomes these limitations would enable improved integrated circuit performance.

SUMMARY

This Summary, together with any Claims, is a brief set of signifiers for at least one ECIN (which can be a discovery, see 35 USC 100(a); and see 35 USC 100(j)), for use in commerce for which the Specification and Drawings satisfy 35 USC 112.

In one or more ECINs disclosed herein, clock period synthesis (CPS) methods are disclosed that enable shorter runtime latency, higher computational job throughput, more efficient power management, and a lower implementation cost than existing clock waveform methods for high-speed processors.

In some embodiments of the ECINs disclosed herein, the clock period is selectively increased or decreased to energy more efficiently than inserting 'No Operation' instructions (NOPs), and which also makes it easier to enable software support in the compiler.

In some embodiments of the ECINs disclosed herein, the CPS methods can be specified by the user in a Service Level Agreement (SLA), for example, with the use specifying a clock period and waveform that minimizes power consumption, that reduces peak consumption, or that minimizes time of execution of the algorithm. In other embodiments, some CPS methods are scheduled by a compiler and enabled by the processor during execution when an upcoming power problem is anticipated.

In some embodiments of the ECINs disclosed herein, the CPS circuit comprises a digital logic circuit that generates a unique clock waveform (period and duty cycle) for each individual instruction or operational cycle of a processor. The ability to provide a different clock waveform during the operation of each individual instruction cycle enables:
  a. faster operational performance by using the shortest period that satisfies instruction-specific timing constraints,
  b. a simple mechanism for limiting peak power on a per-cycle or cycle-aggregate basis,
  c. a simple mechanism for limiting the di/dt ramp slope for changes in load current, and
  d. the ability to optimize performance and yield by adjusting the duty cycle according to instruction-specific needs.

In some embodiments of the ECINs disclosed herein, CPS is distinct from traditional clock generation methods that generate only one or a few operating frequencies, without the edge placement precision of CPS, and without the ability to provide a different waveform on each cycle. Advantageously, CPS uses a fully-decoded high-speed shift register instead of a traditional approach of using a counter or encoded Finite State Machine. The CPS fully-decoded shift register operates at a much higher speed than traditional approaches because there are no extra logic elements between the sequential elements. Circuits with fewer logic levels can operate at higher speeds.

In some embodiments of the ECINs disclosed herein, CPS reuses the same shift register sequential elements for the clock high time and clock low time, and for edges that start or end on the rising or falling edge of the high-speed clock. Reusing the same shift register for four different purposes is more efficient than traditional clock generation approaches that may require four different circuits for these four purposes. Reusing the shift register saves chip layout area, improves yield (thus lowering manufacturing costs), and saves power.

In some embodiments of the ECINs disclosed herein, the CPS uses an efficient activation mechanism to provide edge-placement resolution at half of the high frequency clock period, in contrast to traditional approaches that operate at only the coarser resolution of the full high frequency clock period. Support for half-period resolution with only a tiny incremental circuit area and power cost is a significant advantage.

In some embodiments of the ECINs disclosed herein, CPS can operate with a very high frequency input clock using physical design techniques that are applicable to the specific CPS microarchitecture. Some of the high-performance physical design techniques used by CPS may not be applicable to traditional approaches. Microarchitecture-specific techniques include:
A. Counter-flow clock distribution network routing to maximize performance while ensuring reliable, power-efficient operation.
B. Exploiting the useful-skew of the monotonically increasing latency of the clock arrival time to reduce the demands on time-critical enable signal propagation.
C. Double Data Rate preload parameter delivery.
D. All of the complex command processing arithmetic is performed in a low-speed clock domain, with fully decoded parameters passed into the high-speed clock domain.
E. Self-synchronized shift register reload operation.
F. Self-synchronized clock pulse multiplexer.
G. Metastability-immune toggle flop to cross from the high-speed clock domain to the low-speed clock domain.

Other high-speed implementation techniques that are not microarchitecture-specific include:
a. Pre-placement of critical high-speed cells to control parasitic interconnect resistance and capacitance,
b. Pre-routing of critical clock and other high-fanout signals to balance the delay relative delays
c. Replicating sequential cells and buffer drivers to minimize the circuit latency
d. Operation in a high voltage power domain for faster switching operation
e. Use of extremely low threshold voltage transistors
f. Use of high-speed library cells with extra wide transistors
g. Use of high drive strength cells to operate faster and also to minimize electromigration and aging for circuits operating in the high-speed clock domain.

This Summary does not completely signify any ECIN. While this Summary can signify at least one essential element of an ECIN enabled by the Specification and Figures, the Summary does not signify any limitation in the scope of any ECIN.

BRIEF DESCRIPTION OF DRAWINGS

The following Detailed Description, Figures, and Claims signify the uses of and progress enabled by one or more ECINs. All of the Figures are used only to provide knowledge and understanding and do not limit the scope of any ECIN. Such Figures are not necessarily drawn to scale. A brief list of Figures is below.

Figure 1:
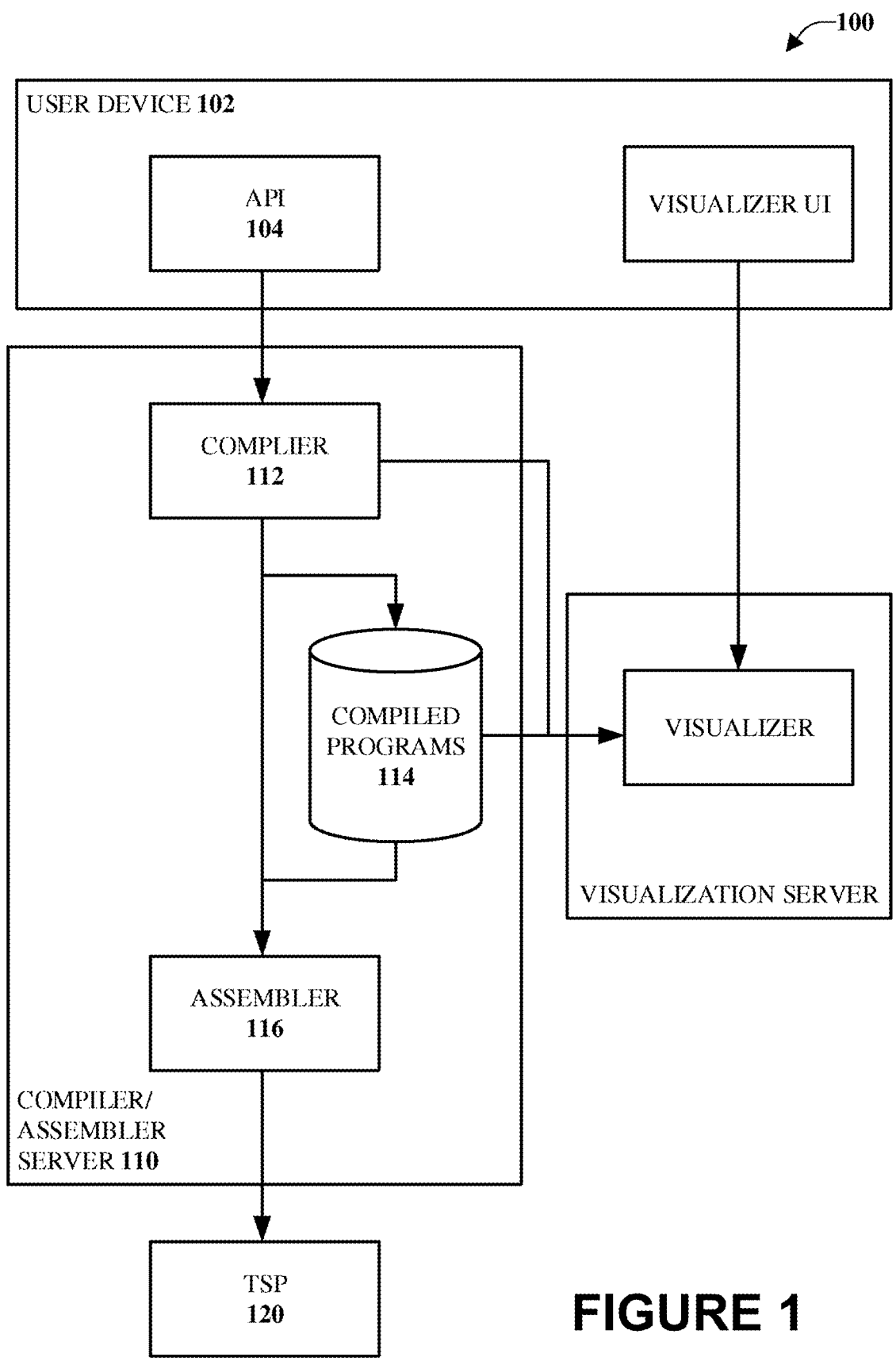
FIG. 1 depicts a system for compiling programs to be executed on a tensor processor.

The Figures can have the same, or similar, reference signifiers in the form of labels (such as alphanumeric symbols, e.g., reference numerals), and can signify a similar or equivalent function or use. Further, reference signifiers of the same type can be distinguished by appending to the reference label a dash and a second label that distinguishes among the similar signifiers. If only the first label is used in the Specification, its use applies to any similar component having the same label irrespective of any other reference labels.

In the Figures, reference signs can be omitted as is consistent with accepted engineering practice; however, a skilled person will understand that the illustrated components are understood in the context of the Figures as a whole, of the accompanying writings about such Figures, and of the embodiments of the claimed inventions.

DETAILED DESCRIPTION

The Figures and Detailed Description, only to provide knowledge and understanding, signify at least one ECIN. To minimize the length of the Detailed Description, while various features, structures or characteristics can be described together in a single embodiment, they also can be used in other embodiments without being written about. Variations of any of these elements, and modules, processes, machines, systems, manufactures or compositions disclosed by such embodiments and/or examples are easily used in commerce. The Figures and Detailed Description signify, implicitly or explicitly, advantages and improvements of at least one ECIN for use in commerce.

In the Figures and Detailed Description, numerous specific details can be described to enable at least one ECIN. Any embodiment disclosed herein signifies a tangible form of a claimed invention. To not diminish the significance of the embodiments and/or examples in this Detailed Description, some elements that are known to a skilled person can be combined together for presentation and for illustration purposes and not be specified in detail. To not diminish the significance of these embodiments and/or examples, some well-known processes, machines, systems, manufactures or compositions are not written about in detail. However, a skilled person can use these embodiments and/or examples in commerce without these specific details or their equivalents. Thus, the Detailed Description focuses on enabling the inventive elements of any ECIN. Where this Detailed Description refers to some elements in the singular tense, more than one element can be depicted in the Figures and like elements are labeled with like numerals.

FIG. 1 illustrates a system 100 for compiling programs to be executed on a tensor processor, and for generating power usage information for the compiled programs, according to an embodiment. The system 100 includes a user device 102, a server 110, and a processor 120. Each of these components, and their sub-components (if any) are described in greater detail below. Although a particular configuration of components is described herein, in other embodiments the system 100 have different components and these components perform the functions of the system 100 in a different order or using a different mechanism. For example, while FIG. 1 illustrates a single server 110, in other embodiments, compilation, assembly, and power usage functions are performed on different devices. For example, in some embodiments, at least a portion of the functions performed by the server 110 are performed by the user device 102.

The user device 102 comprises any electronic computing device, such as a personal computer, laptop, or workstation, which uses an Application Program Interface (API) 104 to construct programs to be run on the processor 120. The server 110 receives a program specified by the user at the user device 102, and compiles the program to generate a compiled program 114. In some embodiments, a compiled program 114 enables a data model for predictions that processes input data and makes a prediction from the input data. Examples of predictions are category classifications made with a classifier, or predictions of time series values. In some embodiments, the prediction model describes a machine learning model that includes nodes, tensors, and weights. In one embodiment, the prediction model is specified as a TensorFlow model, the compiler 112 is a TensorFlow compiler and the processor 120 is a tensor processor. In another embodiment, the prediction model is specified as a PyTorch model, the compiler is a PyTorch compiler. In other embodiments, other machine learning specification languages and compilers are used. For example, in some embodiments, the prediction model defines nodes representing operators (e.g., arithmetic operators, matrix transformation operators, Boolean operators, etc.), tensors representing operands (e.g., values that the operators modify, such as scalar values, vector values, and matrix values, which may be represented in integer or floating-point format), and weight values that are generated and stored in the model after training. In some embodiments, where the processor 120 is a tensor processor having a functional slice architecture, the compiler 112 generates an explicit plan for how the processor will execute the program, by translating the program into a set of operations that are executed by the processor 120, specifying when each instruction will be executed, which functional slices will perform the work, and which stream registers will hold the operands. This type of scheduling is known as "deterministic scheduling". This explicit plan for execution includes information for explicit prediction of excessive power usage by the processor when executing the program.

The assembler 116 receives compiled programs 114, generated by the compiler 112, and performs final compilation and linking of the scheduled instructions to generate a compiled binary. In some embodiments, the assembler 116 maps the scheduled instructions indicated in the compiled program 114 to the hardware of the server 110, and then determines the exact component queue in which to place each instruction.

The processor 120, e.g., is a hardware device with a massive number of matrix multiplier units that accepts a compiled binary assembled by the assembler 116, and executes the instructions included in the compiled binary.

The processor 120 typically includes one or more blocks of circuitry for matrix arithmetic, numerical conversion, vector computation, short-term memory, and data permutation/switching. Once such processor 120 is a tensor processor having a functional slice architecture. In some embodiments, the processor 120 comprises multiple tensor processors connected together.

Example Processor

Figure 2A:
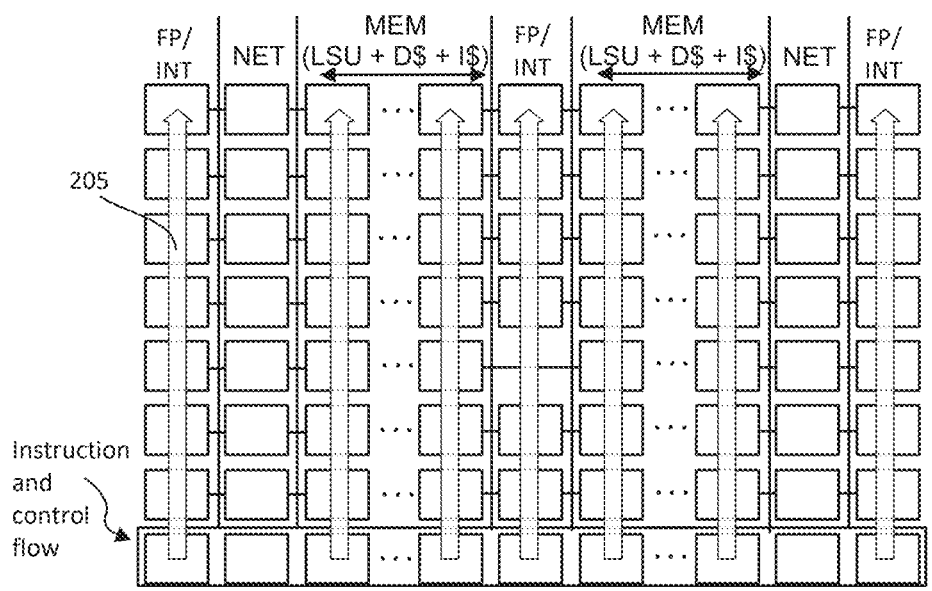
FIGS. 2A and 2B illustrate instruction and data flow in a processor having a functional slice architecture.
Figure 2B:
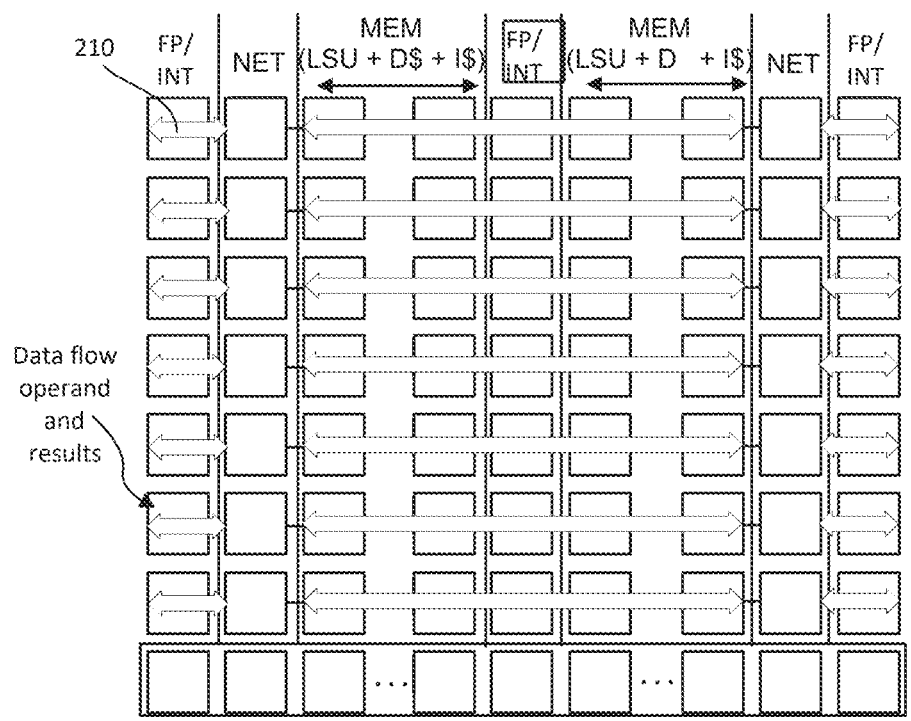

FIGS. 2A and 2B illustrate instruction and data flow in a processor having a functional slice architecture, in accordance with some embodiments. One enablement of processor 200 is as an application specific integrated circuit (ASIC), and corresponds to processor 120 illustrated in FIG. 1.

The functional units of processor 200 (also referred to as "functional tiles") are aggregated into a plurality of functional process units (hereafter referred to as "slices") 205, each corresponding to a particular function type in some embodiments. For example, different functional slices of the processor correspond to processing units for MEM (memory), VXM (vector execution module), MXM (matrix execution module), NIM (numerical interpretation module), and SXM (switching and permutation module). In other embodiments, each tile may include an aggregation of functional units such as a tile having both MEM and execution units by way of example. As illustrated in FIGS. 2A and 2B, each slice corresponds to a column of N functional units extending in a direction different (e.g., orthogonal) to the direction of the flow of data. The functional units of each slice can share an instruction queue (not shown) that stores instructions, and an instruction control unit (ICU) 210 that controls execution flow of the instructions. The instructions in a given instruction queue are executed only by functional units in the queue's associated slice and are not executed by another slice of the processor. In other embodiments, each functional unit has an associated ICU that controls the execution flow of the instructions.

Processor 200 also includes communication lanes to carry data between the functional units of different slices. Each communication lane connects to each of the slices 205 of processor 200. In some embodiments, a communication lane 220 that connects a row of functional units of adjacent slices is referred to as a "super-lane", and comprises multiple data lanes, or "streams", each configured to transport data values along a particular direction. For example, in some embodiments, each functional unit of processor 200 is connected to corresponding functional units on adjacent slices by a super-lane made up of multiple lanes. In other embodiments, processor 200 includes communication devices, such as a router, to carry data between adjacent functional units.

By arranging the functional units of processor 200 into different functional slices 205, the on-chip instruction and control flow of processor 200 is decoupled from the data flow. Since many types of data are acted upon by the same set of instructions, what is important for visualization is visualizing the flow of instructions, not the flow of data. For some embodiments, FIG. 2A illustrates the flow of instructions within the processor architecture, while FIG. 2B illustrates the flow of data within the processor architecture. As illustrated in FIGS. 2A and 2B, the instructions and control signals flow in a first direction across the functional units of processor 200 (e.g., along the length of the functional slices 205), while the data flows 220 flow in a second direction across the functional units of processor 200 (e.g., across the functional slices) that is non-parallel to the first direction, via the communication lanes (e.g., super-lanes) connecting the slices.

In some embodiments, the functional units in the same slice execute instructions in a 'staggered' fashion where instructions are issued tile-by-tile within the slice over a period of N cycles. For example, the ICU for a given slice may, during a first clock cycle, issues an instruction to a first tile of the slice (e.g., the bottom tile of the slice closest to the ICU of the slice), which is passed to subsequent functional units of the slice over subsequent cycles. That is, each row of functional units (corresponding to functional units along a particular super-lane) of processor 200 executes the same set of instructions, albeit offset in time, relative to the functional units of an adjacent row.

The functional slices of the processor are arranged such that operand data read from a memory slice is intercepted by different functional slices as the data moves across the chip, and results flow in the opposite direction where they are then written back to memory. For example, a first data flow from a first memory slice flows in a first direction (e.g., towards the right), where it is intercepted by a VXM slice that performs a vector operation on the received data. The data flow then continues to an MXM slice which performs a matrix operation on the received data. The processed data then flows in a second direction opposite from the first direction (e.g., towards the left), where it is again intercepted by a VXM slice to perform an accumulate operation, and then written back to the memory slice.

In some embodiments, the functional slices of the processor are arranged such that data flow between memory and functional slices occur in both the first and second directions. For example, a second data flow originating from a second memory slice that travels in the second direction towards a second slice, where the data is intercepted and processed by a VXM slice before traveling to the second MXM slice. The results of the matrix operation performed by the second MXM slice then flow in the first direction back towards the second memory slice.

In some embodiments, stream registers are located along a super-lane of the processor. The stream registers are located between functional slices of the processor to facilitate the transport of data (e.g., operands and results) along each super-lane. For example, within the memory region of the processor, stream registers are located between sets of four MEM units. The stream registers are architecturally visible to the compiler, and serve as the primary hardware structure through which the compiler has visibility into the program's execution. Each functional unit of the set contains stream circuitry configured to allow the functional unit to read or write to the stream registers in either direction of the super-lane. In some embodiments, each stream register is implemented as a collection of registers, corresponding to each stream of the super-lane, and sized based upon the basic data type used by the processor (e.g., if the TSP's basic data type is an INT8, each register may be 8-bits wide). In some embodiments, in order to support larger operands (e.g., FP16 or INT32), multiple registers are collectively treated as one operand, where the operand is transmitted over multiple streams of the super-lane.

All of these functional features—superlanes of functional units, slices of instruction flow, handling of different types of integers and floating-point numbers, occurring trillions of times a second, create complicated power flows and possible disruptive power fluctuations that could negatively impact the performance of the processor. However, given the deterministic nature of executions by the processor, any disruptive power fluctuations (such as voltage droop) can be determined before execution of the program, with information (such as processor instructions, and timing for such instructions) about such fluctuations being supplied by the compiler to the processor, for the processor to use during program execution to mitigate the fluctuations.

Processor Power Control

In some of the ECINs disclosed here, clock period synthesis is used to achieve more efficient power management in a processor, especially tensor and graphical processors which perform billions and trillions of floating-point operations per second. A large number of such operations that are executed at the same time, or nearly at the same time, can create potentially damaging electric current flows in the processor, which can cause heat flows that are damaging, making it important to minimize changes in current flow (di/dt) during execution of a program.

In some of the ECINs disclosed herein, clock period synthesis is enabled by adding additional hardware and software instructions to a processor.

Clock Waveform and Power Usage

Figure 3A:
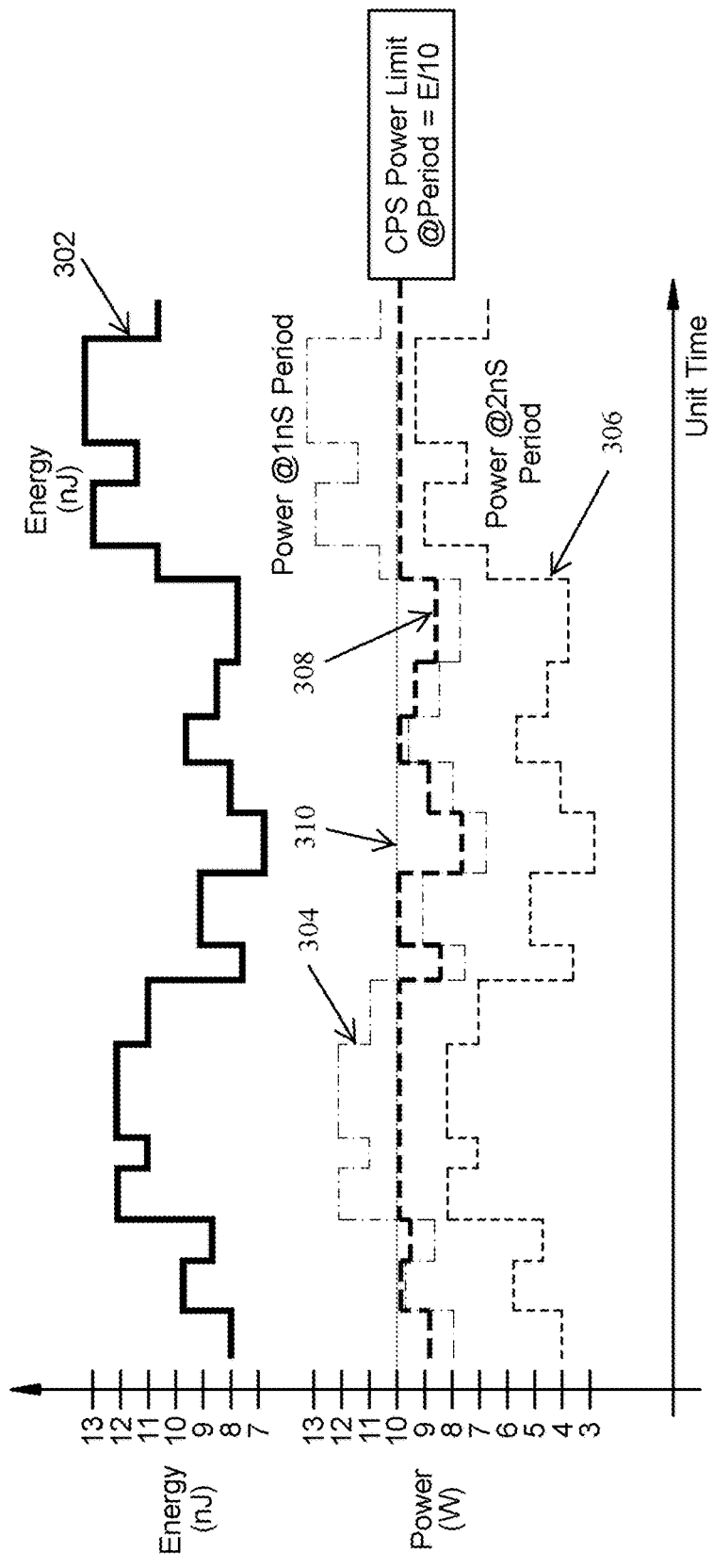
FIG. 3A-3C depict various clock waveforms and related energy usage.
Figure 3B:
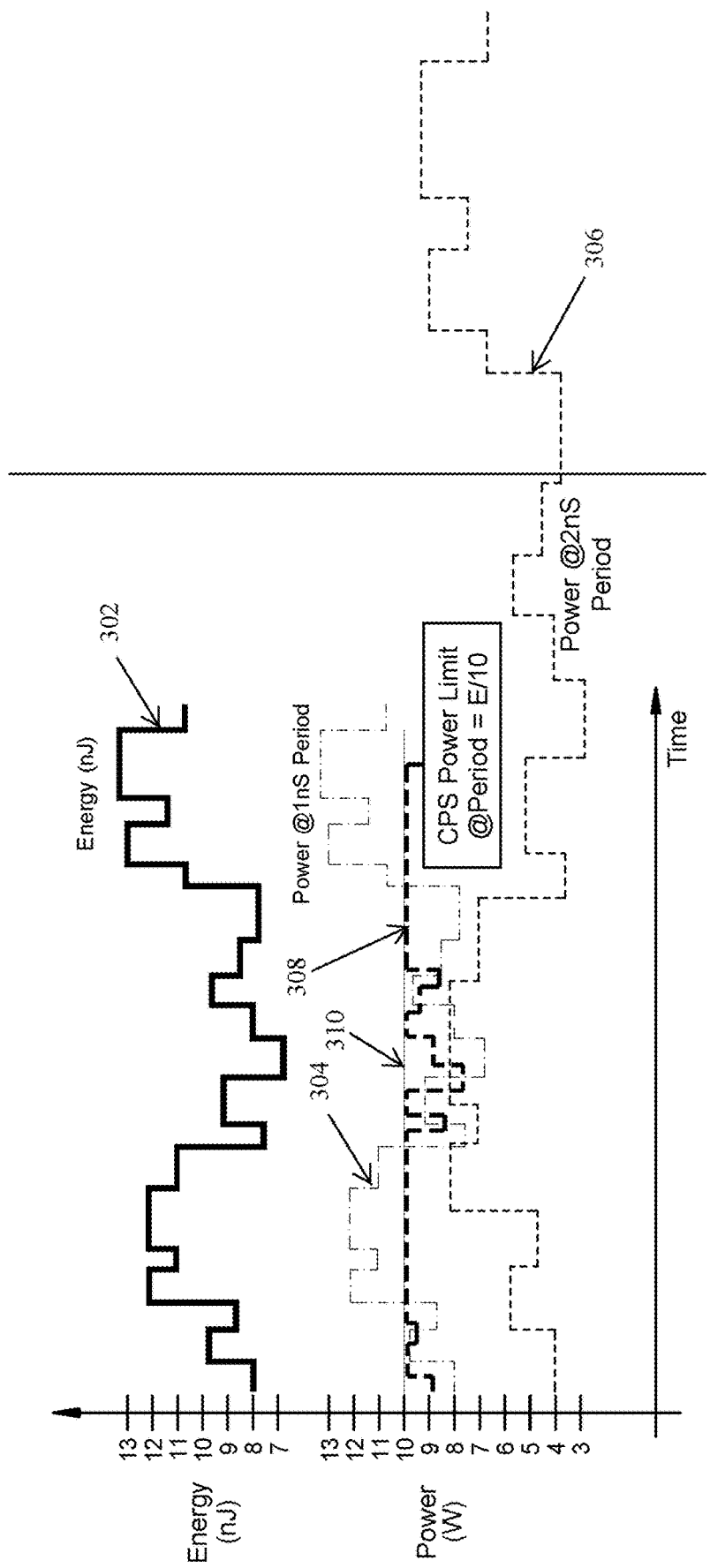
Figure 3C:
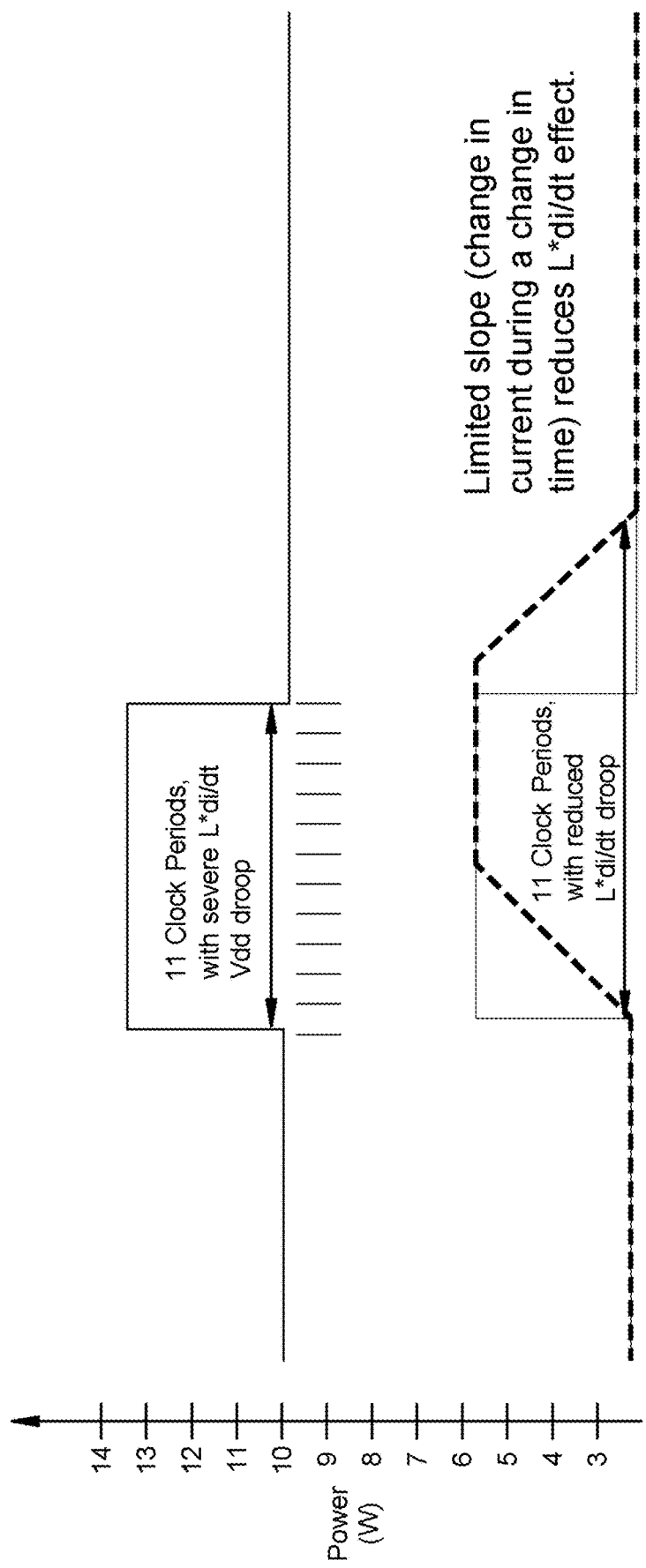

FIG. 3A-3C depict exemplary clock waveforms, and power usage by the processor driven by the waveforms. Power consumption is a function of a processor's clock waveform, and is roughly proportional to the capacitance (C) of all of the processor's switches multiplied by the square of the processors main voltage supply (Vdd) divided by the period (P) of the clock waveform (C*Vdd*Vdd/P). A processor, for example, using a 1 nanosecond clock period will consume twice as much power as a processor using a 2 nanosecond clock period, albeit performing the algorithm approximately twice as fast.

In FIG. 3A, a first waveform 302 represents the energy used by a hypothetical processor for each respective time period. A second waveform 304 represents the corresponding power dissipated with a 1 nS clock period. A third waveform 306 represents the lower power for a clock with a slower 2 nS period intended to operate the circuit such that the maximum power is less than the line 310 at 10 W. A fourth waveform 308 represents the use of CPS to dynamically change the clock period such that the period is set to E/10 nS long so that the maximum power is less than the line 310 at 10 W. Note that in FIG. 3A, the fourth waveform 308 and the third waveform 306 are purposefully not drawn to scale to make these principles easier to illustrate.

Refer now to FIG. 3B where the third waveform 306 is drawn to scale, showing that the total runtime of the program for the third waveform configuration is twice as long as the second waveform 304. The fourth waveform 308 in FIG. 3B is also drawn to scale showing how some clock periods (i.e. when the power would have been above the line 310) are lengthened to lower the power, and the clock periods that would have been below the line 310 are shortened such that the total CPS runtime is much faster than the third waveform 306, and may in some circumstances be faster than the second waveform 304 as this example shows.

Clock Period Synthesis—Hardware

In some of the ECINs disclosed herein, the processor comprises the following four elements: a High Frequency Clock (HFC) generated by an on-chip Phase-Locked Loop (PLL) circuit where the period of the HFC is preferably shorter than the nominal period of the main clock (ChipClock) period; a waveform generator to produce the more useful ChipClock waveforms disclosed herein; a duration logic block to preload values for the waveform generator; and an instruction control unit (ICU) to provide instructions for the CPS methods disclosed herein.

ChipClock waveform resolution typically is half of the HFC period, representing the smallest increment of change for the ChipClock period. The duration of half of the HFC period is called the High Frequency Clock Phase Period (HFCPP). For example, the HFC period for the TSP tensor processor from Groq, Inc., is about 27.78 picoseconds.

As an example, an HFC period that is one-eighth the nominal ChipClock period enables an HFCPP that is 1/16th of the nominal ChipClock period. This HFCPP enables a clock period waveform resolution granularity of plus-or-minus 6.25%.

ChipClock periods that are enabled are integer multiples of the HFCPP. The multiple does not need to be a power of two. The chip reset signal sets the ChipClock period to the Default ChipClock duration. The DefaultChipClock period can be overwritten using a configuration register. The configuration register also has a MinClockPeriod field which is the minimum number of HFCPP periods allowed for Chip-Clock, and a EnableClockChange flag that prohibits any ChipClock period changes. The default value of the Min-ClockPeriod minimum ChipClock period register is equal to the hardware value of the DefaultChipClock period. The DefaultChipClock period should never be set to a value less than the MinClockPeriod. The default value of the Enable-ClockChange flag is FALSE to prohibit clock period changes until a configuration register write operation sets the value of the flag to TRUE. After the processor has booted (restarted) and a program is running, if the EnableClock-Change flag is set to TRUE, ChipClock period changes are determined exclusively by subsequent software instructions, and a configuration register write operation should not be used to change the period until after the user instructions have completed.

The minimum ChipClock period is eight times the HFCPP, where the minimum ChipClock high time (the amount of time the clock is in the high state, and the duty cycle is the percentage of the clock is high) is four times the HFCPP, and the minimum low time is four times the HFCPP, forming a waveform with a 50/50 duty cycle. The minimum ChipClock period constraint implies that the HFC period should be less than or equal to one-fourth of the shortest ChipClock period that will be used. That is, the HFC frequency is at least four times the frequency of the fastest ChipClock frequency that is used.

The longest possible ChipClock period is limited by either the maximum size of the Target ChipClock Period field in the instruction format which supports the use of up to $2^9=512$ HFCPP long clock periods, or by the number of shift register stages implemented in the CPS high-speed shift register, whichever is smaller. The instruction format and CPS high-speed shift register properties are described in respective sections below.

Automatic Ramp from One Period to the Next Period

In some of the ECINs disclosed herein, processor current flow changes (di/dt) are managed by setting the Slope, Steep, and Linear fields in a CPS instruction word to values that increase or decrease the rate of change of the current drawn by the processor per unit time. This capability, depicted in FIG. 3C, is used to control the rate of change in load current imposed on the voltage regulator during large step increases in load current, or during large release reductions in load current (when fewer instructions are being executed).

When Linear=0 and Steep=0, the ChipClock period is increased or decreased by another unit of HFCPP after each time Slope ChipClock periods have been completed, until the ChipClock period equals the TargetPeriod. A larger Slope value will cause the di/dt value to be smaller. When Steep=0, Rise=1, and Run=Slope, the Ramp angle=Rise/Run.

When Linear=0 and Steep=1, the ChipClock period is increased or decreased by Slope units of HFCPP after each ChipClock period has been completed, until the ChipClock period equals the TargetPeriod. A larger Slope value will cause the di/dt value to be larger. When Steep=1, Rise=Slope, and Run=1, the Ramp angle=Rise/Run.

When Linear=1, Steep=0 and Slope=1, the ChipClock period is increased or decreased slowly in a way that limits the di/dt change to a small, fixed value. The change in ChipClock period from one period to a new period that is one HFCPP unit larger or smaller is spread across several blocks on ChipClock periods so that the average di/dt during each block of ChipClock periods is smaller than some specified di/dt limit value. For example, if the current ChipClock period is 13 HFCPP units and the target new ChipClock period is 14 HFCPP units, the di/dt step change would equal one divided by 13, or 7.69%. Assuming a specification that di/dt must not exceed 1%, then the period transition from 13 to 14 must be spread over Ceiling(7.69)=8 blocks, where each block is 8 ChipClock periods long, and the duration of each ChipClock period in each block is either 13 or 14, and the number of ChipClock periods that are 14 in each block increases by one for each block moving from all 13 to all 14 after 8 blocks. The position of each shorter or longer period is chosen to be spread out as much as possible to minimize the local average change over any interval of ChipClock periods.

Instructions for Runtime Acceleration

With adequate timing information describing different timing support for different subsets of instructions, the compiler can identify sets of instruction cycles that may operate at a shorter clock period than other instruction sets.

To exploit this opportunity, the hardware design process for a processor that uses CPS runtime acceleration needs to include additional timing closure activities. For example, a processor designer partitions the chip into several subsets of instructions or circuit operations. At least one of these partitions is designed to run faster than at least one other partition that runs slower. The processor designer uses Static Timing Analysis (STA) to close timing, which means that all circuit timing properties are verified to satisfy applicable timing constraints. The designer closes timing, for example, at 1.1 GHz for the slower partition, and closes timing at 1.2 GHz for the faster partition. The designer should give special attention when closing timing on a circuitry subset of the chip, to prevent any metastability-triggering situations.

Prior to, or during execution, the ChipClock period is configured to satisfy the most stringent requirements of any instruction that is active. This may be done in the processor instruction sequence compiler prior to execution, or it may be done by a circuit or processor during runtime execution. An active instruction is either a newly dispatched instruction, or the subsequent cycles of a multi-cycle instruction that was dispatched previously. For example, the ChipClock period is set to the longest period required by any active instruction. If all active instructions are in the faster partition for certain clock cycles, then the chip will run faster than during other clock cycles when some active instructions are from the slower partition.

Clock Period Synthesis Circuit Description

Figure 4:
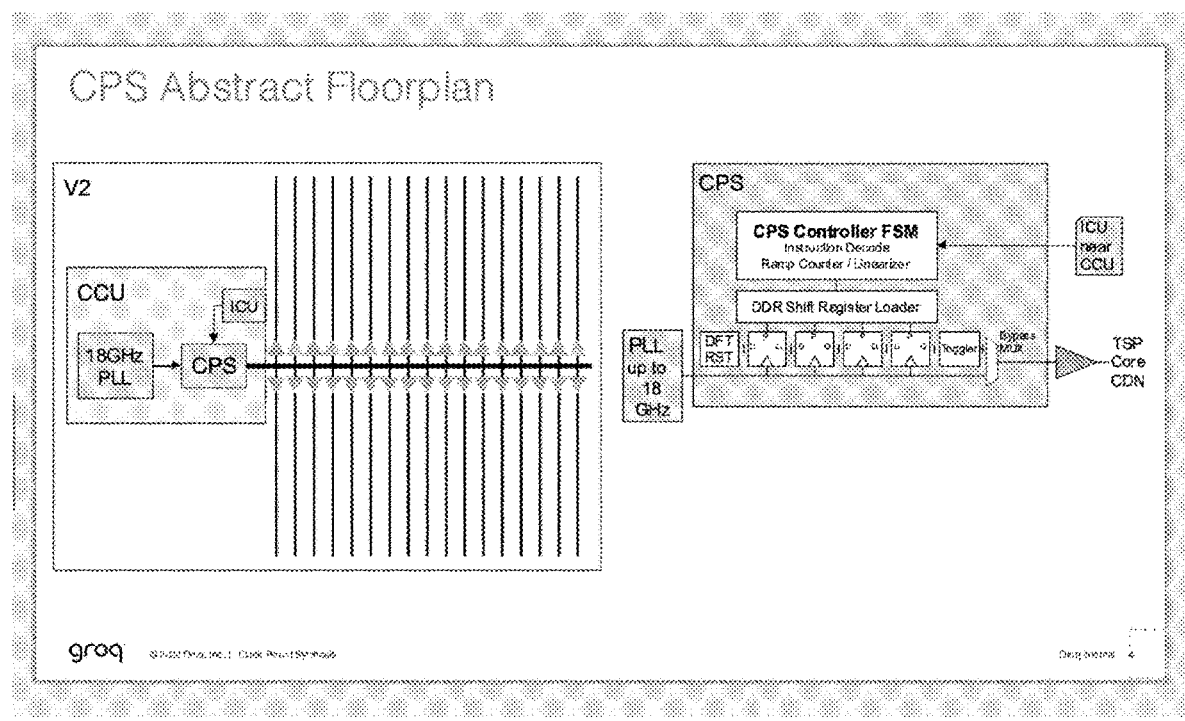
FIG. 4 depicts an abstract floor plan for a processor with circuitry for a clock period synthesis system.

A relatively small number of logic gates are required for CPS. FIG. 4 depicts an exemplary CPS circuit that is physically implemented as part of the PLL/Clock Control Module, and the CPS ICU uses the nearest, most appropriate ICU block. For example, for the TSP tensor processor available from Groq, given that the main vertical clock spine is located along the central axis of the processor, a preferred location of the PLL/Clock Control Module is as close as possible to the central axis at the bottom center of the chip. This location makes it desirable to locate the CPS ICU near the ICU blocks that serve VXM slices near the center of the chip. The root of a clock distribution network may be located in other configurations on other chips, and there may be more than one clock generated on any particular chip.

Also depicted in FIG. 4 is a toggle flip-flop structure used by the CPS, with programmable delays to determine the high-time and low-time of ChipClock. Programmable delays are implemented as shift registers that are clocked by a high frequency clock that operates at, for example, eight times the nominal chip clock frequency. The duration of each phase of each clock cycle is determined by 'next state' values loaded into the high state and low state shift registers, respectively. Next state logic preloads the shift registers with new period values on respective ChipClock edges. For a given resolution, the dynamic power of the shift registers can be cut in half by using rising and falling edges to implement half-cycle resolution, where the precision of this operation depends on the degree of symmetry in the duty cycle of the high frequency reference clock. Power and implementation area can be further reduced by reusing a single shift register for both the high and low phases of the generated clock waveform.

The period of the high frequency clock and the number of shift register stages required for CPS are together determined by the nominal ChipClock period, the desired waveform granularity, and the maximum desired clock period for low power operating modes. For example, with a nominal 1 nS ChipClock period, 6.25% waveform granularity, and a maximum ChipClock period that is 16 times the nominal ChipClock period, the number of shift register stages required would be as follows.

The duration of HFCPP is the ChipClock period times the waveform granularity percentage, for example, 1 nS*6.25%=0.0625 nS (nanoseconds). The period of the HFC is two times the duration of HFCPP, which here equals 2*0.0625 nS=0.125 nS, so the HFC would be 8 GHz. The number of shift register stages required is the maximum ChipClock period divided by the HFC period, or 16 nS/0.125 nS=128 DFF stages, plus a few extra DFFs to implement one HFCPP resolution.

Figure 5A:
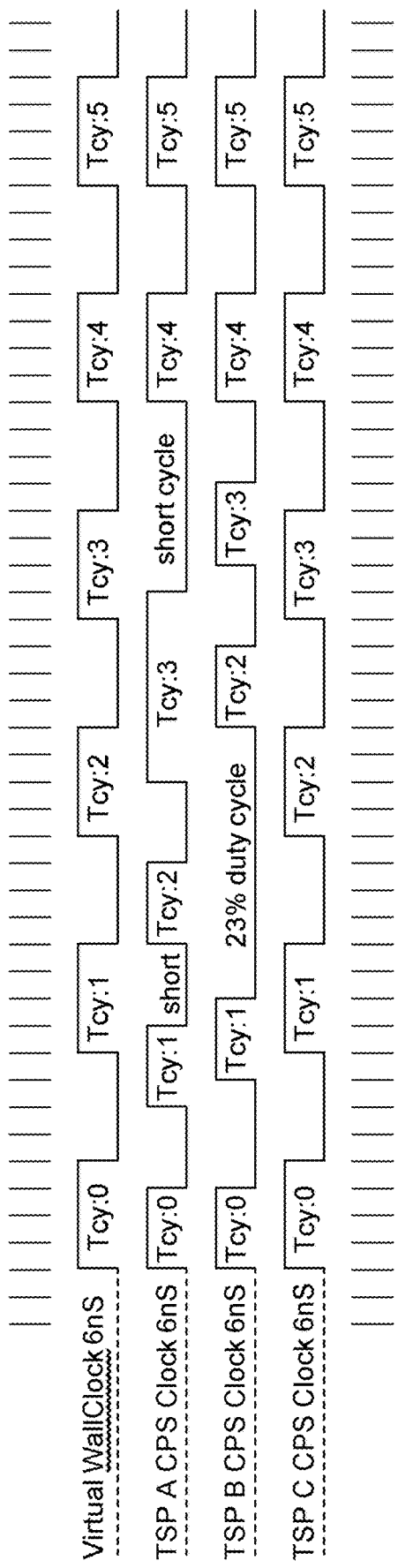
FIGS. 5A-5C depict deterministic relativity showing a global clock frequency compared to a virtual time across multiple devices.
Figure 5B:
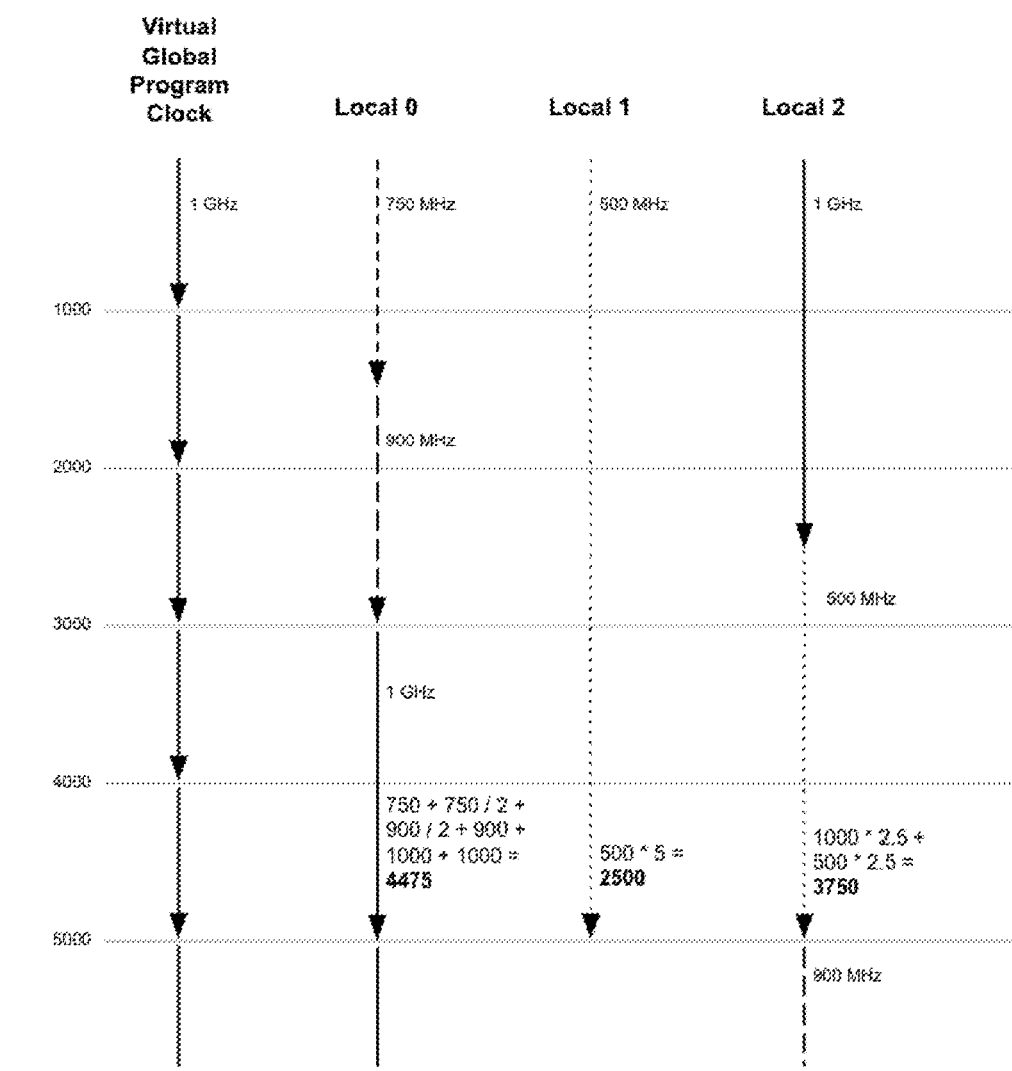
Figure 5C:
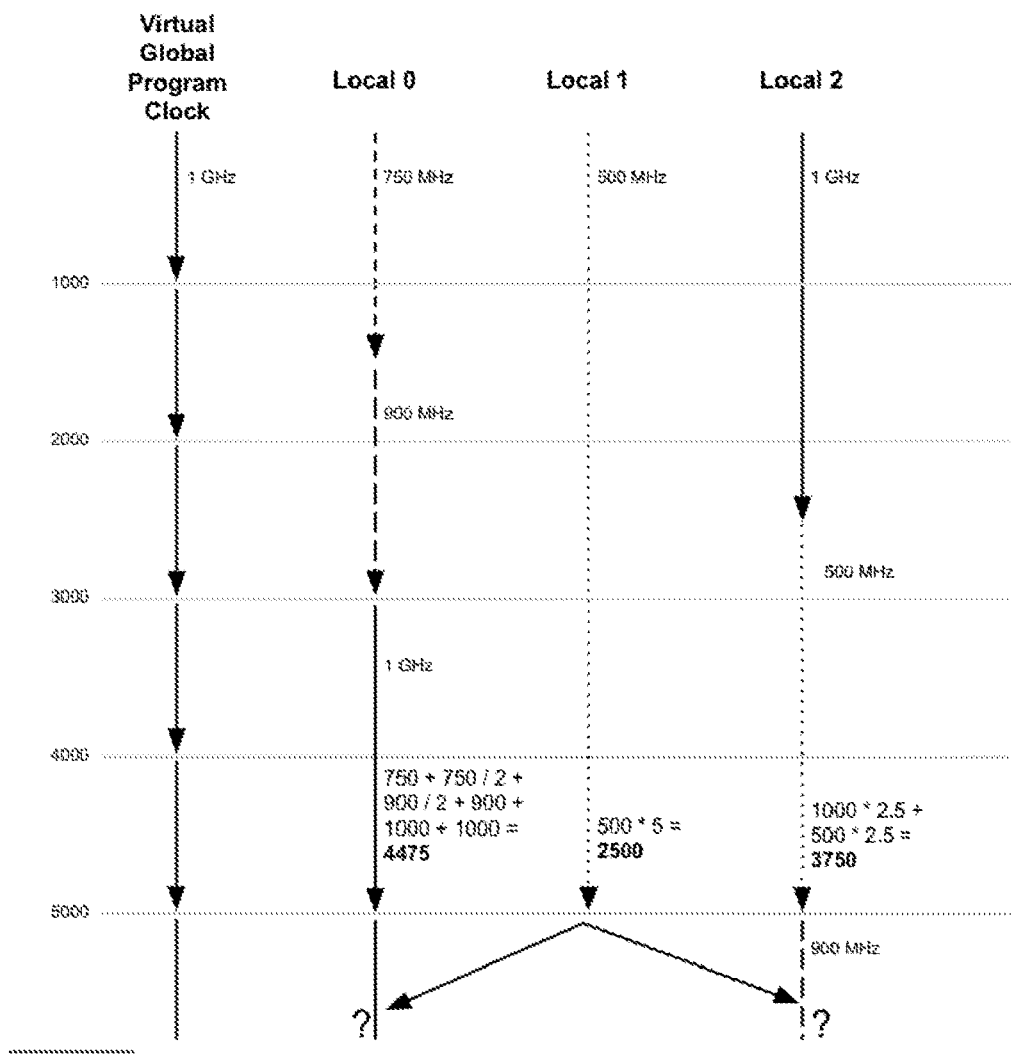

FIG. 5A depicts a global clock frequency versus virtual time for a single device. Specifically, FIG. 5A depicts a global clock and a plurality of clocks driving a plurality of devices. In FIGS. 5B and 5C, deterministic relativity requires that devices (also referred to as 'chips') are first synchronized. Clock alignment is considered a virtual global program clock. Individual chips can vary their local program clock relative to the global program clock depending on the instructions in the various queues and the associated power requirements for such instructions. Each local program clock cycle maps to a single global program clock cycle. The local program always knows where it is at in global program time.

In FIGS. 5B and 5C, local programs have the flexibility to be at different cycle counts in their program execution. By way of illustration, a first chip, "Local 1," transmits data at local time 2500 (global time 5000). The precise control of the clock period and duty cycle. enables each chip of a larger processor device to reduce peak power by lengthening the period of clock cycles that exhibit high energy activity with the advantage that the worst-case di/dt is also reduced. Because chips that execute only a certain subset of instructions that have been characterized to pass timing with a shorter clock period as long as the activity is still below the maximum (which is likely in practice) improves the manufacturing yield and reliability with little to no impact. Shortening low-activity clock cycles allows the runtime latency to be improved. For generally high-power applications, this may compensate for the lengthening during high activity cycles, and for low-power applications, it may achieve shorter latency than would be possible by compiler optimization of the instruction sequence without CPS.

Clock Period Synthesis—Software Requirements

Clock Period Synthesis Instructions

CPS instructions are intentionally orthogonal to other functional instructions, which means that the functional instruction sequence is scheduled by the compiler or human programmer without consideration of CPS instructions, and then CPS instructions are determined by an efficient post-processing operation based on the available instruction sequence. This orthogonality facilitates much faster program compilation than would be possible if power requirements were applied as constraints during the determination of the optimized instruction sequence. In an alternative embodiment, CPS instructions are determined in conjunction with the functional instruction sequence. CPS instructions can dispatch as often as once per ChipClock. In the absence of any CPS instructions for a job, the ChipClock period defaults to a default value at boot time. A configuration register write can be used to overwrite the HW default ChipClock period. Chip Reset sets the ChipClock period to the default value. Cumulative clock periods are aligned at data transfer times, which should be considered invariant during instruction scheduling by the compiler. The Compiler should keep a tally of the real-time duration of the instructions executed on each chip in a multi-TSP system. The real-time values should be deterministically aligned at data transfer times. The Compiler has a great deal of flexibility to optimize clock durations on each individual processor, although the longest duration required during each synchronization interval will dominate.

Software control of ChipClock periods is achieved by configuring eight four CPS instruction parameter values: TargetPeriod, Slope, Steep, and Linear, MostlyHi, ExtraLong, Lengthenable, and Shortenable. All eight parameters are set in each instruction. The TargetPeriod specifies the number of HFCPP periods that will be in each ChipClock period. The Slope, Steep, and Linear fields determine how the current period changes to the TargetPeriod for each intervening clock cycle according to the descriptions in the preceding and following paragraphs. The high time duration is greater-than or equal to the low time duration if the MostlyHi bit is set true in the CPS instruction. If the ExtraLong field has a value greater than zero, then high time is increased in duration by the value of ExtraLong number of HFCPP intervals when MostlyHi is true. The low time duration is greater-than or equal to the high time duration if the MostlyHi bit is set false in the CPS instruction. If the ExtraLong field has a value greater than zero, then low time is increased in duration by the value of ExtraLong number of HFCPP intervals when MostlyHi is false. The sum of the high time plus the low time is equal to the period of the clock cycle. CPS instructions are configured to operate with an asymmetric duty cycle for circuits such as memory arrays, clock gating logic, analog circuits, etc. that require an asymmetric duty cycle for optimized operation. The Length-enable field is set true for clock periods that are eligible to be lengthened for the purpose of aligning the timing of inter-chip deterministic events. The Shortenable field is set true for clock periods that are eligible to be shortened for the purpose of aligning the timing of inter-chip deterministic events.

To control processor current flow changes, di/dt, it is desirable to spread out changes in the magnitude of current drawn by the processor. The Slope, Steep, and Linear parameters specify the size of the incremental steps taken during each ChipClock period change while transitioning from the current value of ChipClock to the TargetPeriod.

CPS Instruction Word Format

| Bit Position | Field Name | Field Description |
|---|---|---|
| 29:21 | TargetPeriod | ChipClock will transition to TargetPeriod according to the Slope, Steep, and Linear options below |
| 20:12 | Slope | ClockPeriod rate of change toward TargetPeriod; If (Slope==0) ClockPeriod = TargetPeriod immediately |
| 11 | Steep | If (Steep == 1) then Slope is the number of HFCPP units add/subtracted during each ChipClock period; If (Steep == 0) then ChipClock period is changed by one HFCPP unit after Slope ChipClock periods |
| 10 | Linear | If (Linear==1) then the Slope is linearized |
| 9 | MostlyHi | Duty Cycle biased to be high longer for odd period durations |
| 8:6 | ExtraLong | Zero to 7 extra HFCPP units added to Hi or Lo phase |
| 5 | Lengthenable | Indicates clock periods eligible to be lengthened for Flit Rate Synchronization |
| 4 | Shortenable | Indicates clock periods eligible to be shortened for Flit Rate Synchronization |
| 3:0 | OpCodeRes | Reserved for Future use; set to zero by default. |

The CPS instruction word format uses 9 bits (shown as Bit Positions 29 through 21 in the above example CPS Instruction Word Format table) for the TargetPeriod field, e.g., bits 21 to 29.

New CPS Instructions immediately preempt previously dispatched instructions, even if the ChipClock period is not yet equal to the TargetPeriod specified in the previous instruction (i.e., the ChipClock period is still changing). Extra care is advised when the Compiler calculates the timing consequences of a preempted CPS instruction.

The Linear field linearizes di/dt as the ChipClock period increases or decreases for small values of the ChipClock period. Without linearization, di/dt would be much larger for each change in ChipClock period for smaller ChipClock period durations. The pattern is a concave curve that has the functional shape of 1/x. By reducing the di/dt for smaller ChipClock periods, the di/dt is linearized, as shown in the Linearization Plot and the Linearization Table below.

Linearization is activated when (Linear==1 AND Steep==0 AND Slope 0), causing the CPS FSM to emit a preselected sequence of period values from a stored table. The number of period values to linearize a transition is equal to the square of the Linearization Block (LB) size. LB size is determined by the ceiling of the ratio of the largest percentage change to or from the TargetPeriod divided by the desired maximum change size. In an ECIN where the minimum clock duration is 8 HFCC intervals, a change to this TargetPeriod value will have a maximum step size of ⅛=12.5%. If the maximum change size is 1%, then LB=the ceiling of (12.5%/1%)=13. For all other TargetPeriod values, LB=CEILING(1/(TargetPeriod−1)/MaxStepSize). Calculated LB values are shown in the table below.

| TargetPeriod (number of HFCPP) | LinearizationBlock (LB) size |
|---|---|
| 8-9 | 13 |
| 10 | 12 |
| 11 | 11 |
| 12 | 10 |
| 13 | 9 |
| 14-15 | 8 |
| 16-17 | 7 |
| 18-21 | 6 |
| 22-26 | 5 |
| 27-34 | 4 |
| 35-51 | 3 |
| 52-101 | 2 |

Operating Point Voltage and Frequency

The ability to set safe and reliable operating conditions is essential for electrical systems. In one ECIN, for TSP processors available from Groq, the main operating Vdd voltage for the processor can be changed via the Board Management Controller (BMC) using a PCB microcontroller that interfaced with the voltage regulators through Serial Peripheral Interface (SPI) bus ports, and similarly the PCB clock generator frequency can be set to provide an appropriate reference clock frequency for the on-chip PLL. Changes to Vdd or the Reference Clock Frequency are made between jobs. Changing the external Reference Clock Frequency while the TSP is operating is not advised because invalid clock periods may result as the PLL tracks to lock-in on the new reference clock frequency. In the best case, if the TSP continued to operate, the latency would be indeterminate because PLL tracking has significant uncertainty, and the power would also be less predictable due to the changing clock frequency. Power levels would also be uncertain during the time it takes a Vdd level change to propagate through the voltage regulator to slew the output voltage to the new setpoint.

Detailed Description—Technology Support from Data/Instructions to Processors/Programs Data and Information. While 'data' and 'information' often are used interchangeably (e.g., 'data processing' and 'information processing'), the term 'datum' (plural 'data') typically signifies a representation of the value of a fact (e.g., the measurement of a physical quantity such as the current in a wire, or the price of gold), or the answer to a question (e.g., "yes" or "no"), while the term 'information' typically signifies a set of data with structure (often signified by 'data structure'). A data structure is used in commerce to transform an electronic device for use as a specific machine as an article of manufacture (see In re Lowry, 32 F.3d 1579 [CAFC, 1994]). Data and information are physical objects, for example binary data (a 'bit', usually signified with '0' and '1') enabled with two levels of voltage in a digital circuit or electronic component. For example, data can be enabled as an electrical, magnetic, optical or acoustical signal or state; a quantum state such as a particle spin that enables a 'qubit'; or a physical state of an atom or molecule. All such data and information, when enabled, are stored, accessed, transferred, combined, compared, or otherwise acted upon, actions that require and dissipate energy.

As used herein, the term 'process' signifies an artificial finite ordered set of physical actions ('action' also signified by 'operation' or 'step') to produce at least one result Some types of actions include transformation and transportation. An action is a technical application of one or more natural laws of science or artificial laws of technology. An action often changes the physical state of a machine, of structures of data and information, or of a composition of matter. Two or more actions can occur at about the same time, or one action can occur before or after another action, if the process produces the same result. A description of the physical actions and/or transformations that comprise a process are often signified with a set of gerund phrases (or their semantic equivalents) that are typically preceded with the signifier 'the steps of' (e.g., "a process comprising the steps of: measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. As used herein, the term 'thread' signifies a subset of an entire process. A process can be partitioned into multiple threads that can be used at or about at the same time.

As used herein, the term 'rule' signifies a process with at least one logical test (signified, e.g., by 'IF test IS TRUE THEN DO process'). As used herein, a 'grammar' is a set of rules for determining the structure of information. Many forms of knowledge, learning, skills and styles are authored, structured, and enabled—objectively—as processes and/or rules—e.g., knowledge and learning as functions in knowledge programming languages.

As used herein, the term 'component' (also signified by 'part', and typically signified by 'element' when described in a patent text or diagram) signifies a physical object that is used to enable a process in combination with other components. For example, electronic components are used in processes that affect the physical state of one or more electromagnetic or quantum particles/waves (e.g., electrons, photons) or quasiparticles (e.g., electron holes, phonons, magnetic domains) and their associated fields or signals. Electronic components have at least two connection points which are attached to conductive components, typically a conductive wire or line, or an optical fiber, with one conductive component end attached to the component and the other end attached to another component, typically as part of a circuit with current or photon flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards.

As used herein, the term 'netlist' is a specification of components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Examples of types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information. For example, the term 'module' can signify a process that transforms data and information, for example, a process comprising a computer program (defined below). The term 'module' also can signify one or more interconnected electronic components, such as digital logic devices. A process comprising a module, if specified in a programming language (defined below), such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals [FACT]. How a module is used, its function, is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules, e.g., a central processing unit ('CPU') module; an input/output ('I/O') module, a memory control module, a network control module, and/or other modules. The term 'processor' can also signify one or more processors, or one or more processors with multiple computational cores/CPUs, specialized processors (for example, graphics processors or signal processors), and their combinations. Where two or more processors interact, one or more of the processors can be remotely located relative to the position of the other processors. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations, quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' or 'timesharing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified network interfaces ('interface' defined below) (e.g., an application program interface ('API') that signifies functions and data structures to communicate with the remote process).

As used herein, the term 'computer' and 'computer system' (further defined below) includes at least one processor that, for example, performs operations on data and information such as (but not limited to) the Boolean logical operations using electronic gates that can comprise transistors, with the addition of memory (for example, memory structured with flip-flops using the NOT-AND or NOT-OR operation). Any processor that can perform the logical AND, OR and NOT operations (or their equivalent) is Turing-complete and computationally universal [FACT]. A computer can comprise a simple structure, for example, comprising an I/O module, a CPU module, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This transfer is discussed in the General Computer Explanation section.

Detailed Description—Technology Support General Computer Explanation

Figure 6:
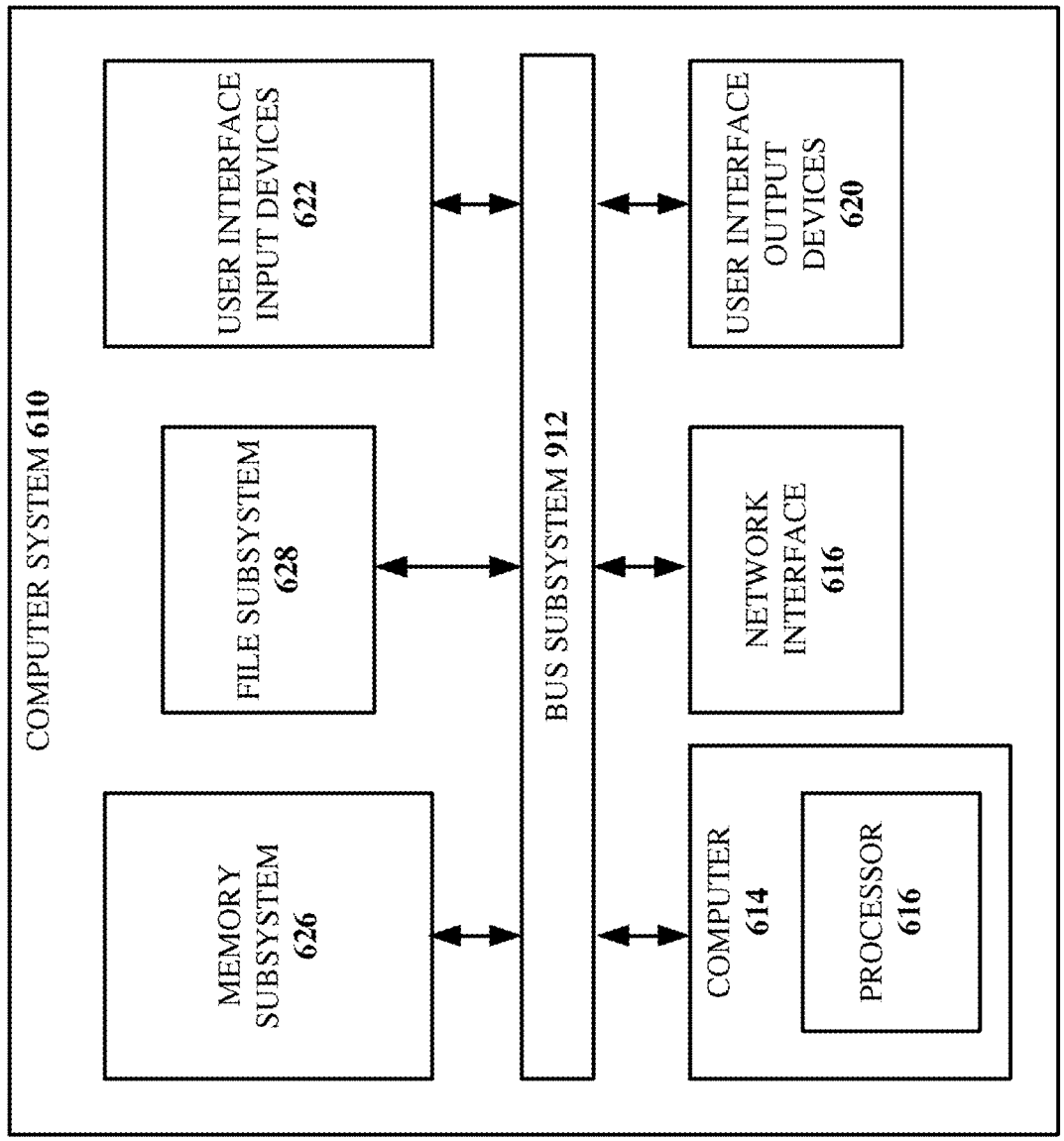
FIG. 6 depicts a computer system suitable for enabling embodiments of the claimed inventions.

FIG. 6 depicts a computer system suitable for enabling embodiments of the claimed inventions.

In FIG. 6, the structure of computer system 610 typically includes at least one computer 614 which communicates with peripheral devices via bus subsystem 612. Typically, the computer 614 includes a processor 616 (e.g., a microprocessor, graphics processing unit, AI co-processor or digital signal processor), or its electronic processing equivalents, such as an Application Specific Integrated Circuit ('ASIC') or Field Programmable Gate Array ('FPGA'). Typically, peripheral devices include a storage subsystem 624, comprising a memory subsystem 626 and a file storage subsystem 628, user interface input devices 622, user interface output devices 620, and/or a network interface subsystem 616. The input and output devices enable direct and remote user interaction with computer system 610. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

Any ECIN is limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 610 depicted in FIG. 6 is intended only as an example. Many other structures of computer system 610 have more or less components than the computer system depicted in FIG. 6.

Network interface subsystem 616 provides an interface to outside networks, including an interface to communication network 618, and is coupled via communication network (not shown) to corresponding interface devices in other computer systems or machines. Communication network can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms ('protocols') can be specified using one or communication languages, such as HTTP, TCP/IP, RTP/RTSP, IPX and/or UDP.

User interface input devices 622 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 610 or onto communication network. User interface input devices typically enable a user to select objects, icons, text and the like that appear on some types of user interface output devices, for example, a display subsystem.

User interface output devices 620 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term 'output device' signifies all possible types of devices and processes to transfer data and information out of computer system 610 to the user or to another machine or computer system. Such devices are connected by wire or wirelessly to a computer system. Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 626 typically includes a number of memories including a main random-access memory ('RAM') 630 (or other volatile storage device) for storage of instructions and data during program execution and a read only memory ('ROM') 632 in which fixed instructions are stored. File storage subsystem 628 provides persistent storage for program and data files, and can include a hard disk drive, a floppy disk drive along with associated removable media, a CD-ROM drive, an optical drive, a flash memory such as a USB drive, or removable media cartridges. If computer system 610 includes an input device that performs optical character recognition, then text and symbols printed on paper can be used as a device for storage of program and data files. The databases and modules used by some embodiments can be stored by file storage subsystem 628.

Bus subsystem 612 provides a device for transmitting data and information between the various components and subsystems of computer system 610. Although bus subsystem 612 is depicted as a single bus, alternative embodiments of the bus subsystem can use multiple buses. For example, a main memory using RAM can communicate directly with file storage systems using Direct Memory Access ('DMA') systems.

A memory, such as a non-transitory, processor readable data and information storage medium associated with file storage subsystem 628, and/or with network interface subsystem 616, and can include a data structure specifying a circuit design. The memory can be a hard disk, a floppy disk, a CD-ROM, an optical medium, removable media cartridge, or any other medium that stores computer readable data in a volatile or non-volatile form, such as text and symbols on a physical object (such as paper) that can be processed by an optical character recognition system. A program transferred in to and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

Detailed Description—Semantic Support

The signifier 'commercial solution' signifies, solely for the following paragraph, a technology domain-specific (and thus non—preemptive—see Bilski): electronic structure, process for a specified machine, manufacturable circuit (and its Church-Turing equivalents), or composition of matter that applies science and/or technology for use in commerce to solve an unmet need of technology.

The signifier 'abstract' (when used in a patent claim for any enabled embodiments disclosed herein for a new commercial solution that is a scientific use of one or more laws of nature {see Benson}, and that solves a problem of technology {see Diehr} for use in commerce—or improves upon an existing solution used in commerce {see Diehr})— is precisely defined by the inventor(s) {see MPEP 2111.01 (9th edition, Rev. 08.2017)} as follows:
  a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or
  b) a new commercial solution is 'abstract' if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. 08.2017)} to be equivalent to the new commercial solution, and is thus unpatentable under 35 U.S.C. 103, for example, because it is 'difficult to understand' how the new commercial solution differs from a PHOSITA-combination/-application of the existing prior art; or
  c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

DETAILED DESCRIPTION—CONCLUSION

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an ECIN comprises a particular feature, structure, function or characteristic, it is within the knowledge and understanding of a skilled person to use such feature, structure, function, or characteristic in connection with another ECIN whether or not explicitly described, for example, as a substitute for another feature, structure, function or characteristic.

In view of the Detailed Description, a skilled person will understand that many variations of any ECIN can be enabled, such as function and structure of elements, described herein while being as useful as the ECIN. One or more elements of an ECIN can be substituted for one or more elements in another ECIN, as will be understood by a skilled person. Writings about any ECIN signify its use in commerce, thereby enabling other skilled people to similarly use this ECIN in commerce.

This Detailed Description is fitly written to provide knowledge and understanding. It is neither exhaustive nor limiting of the precise structures described, but is to be accorded the widest scope consistent with the disclosed principles and features. Without limitation, any and all equivalents described, signified or Incorporated By Reference (or explicitly incorporated) in this patent application are specifically incorporated into the Detailed Description. In addition, any and all variations described, signified or incorporated with respect to any one ECIN also can be included with any other ECIN. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. Any ECIN can have more structure and features than are explicitly specified in the Claims.

What is claimed:

1. A digital circuit for clock waveform synthesis for each individual instruction or operational cycle of a processor, comprising:
- an instruction control unit (ICU) that supplies instructions to control the generation of clock signals;
- a clock pulse synthesis (CPS) controller connected to the ICU, wherein the CPS controller decodes the instructions supplied from the ICU and generates clock waveform parameter signals;
- wherein a CPS circuit comprises the CPS controller and a waveform generator that produces waveforms based on the clock waveform parameter signals;
- a duration logic block that uses the clock waveform parameter signals supplied by the CPS controller and preloads values for the waveform generator;
- a shift register that is clocked by a high frequency clock that operates at a frequency that is higher than a nominal processor clock frequency, wherein the high frequency clock is generated by a phase-locked loop circuit on the processor;
- wherein the shift register is comprised of one or more toggle flip-flop registers that are initialized by using the duration logic block and the clock waveform parameter signals supplied by the CPS controller; and
- a bypass multiplexer that is connected, via an output of the bypass multiplexer, to the processor, wherein the bypass multiplexer is supplied with a first clock signal that is output from the shift register and a second clock signal from a phase locked loop that provides the high frequency clock.

2. The digital circuit of claim 1, wherein the high frequency clock operates at eight times the nominal processor clock frequency.

3. The digital circuit of claim 1, wherein the processor further comprises a main clock operating at the nominal processor clock frequency, and wherein a period of the high frequency clock is shorter than a second period of the main clock.

4. The digital circuit of claim 1, wherein the processor further comprises a main clock, and wherein a first waveform resolution of the main clock is half of a second waveform resolution of the high frequency clock.

5. The digital circuit of claim 1, wherein the CPS circuit comprises a digital logic circuit that generates respective clock waveforms for each individual instruction of a set of instructions or for each operational cycle of the processor.

6. The digital circuit of claim 5, wherein clock waveforms of the respective clock waveforms comprise respective periods and respective duty cycles.

7. The digital circuit of claim 1, wherein the CPS circuit comprises a digital logic circuit that generates respective clock waveforms for each operational cycle of the processor.

8. A system, comprising:
- an instruction control unit (ICU) that supplies instructions to control the generation of clock signals;
- a CPS circuit that comprises a clock pulse synthesis (CPS) controller connected to the ICU, wherein the CPS controller decodes the instructions supplied from the ICU and generates clock waveform parameter signals, wherein the CPS circuit operates as a waveform generator and produces waveforms based on the clock waveform parameter signals;
- a duration logic block that uses the clock waveform parameter signals supplied by the CPS controller and preloads values for the waveform generator;
- a shift register that is clocked by a high frequency clock that operates at a frequency that is higher than a nominal processor clock frequency; and
- a bypass multiplexer that is connected, via an output of the bypass multiplexer, to the processor, wherein the bypass multiplexer is supplied with a first clock signal that is output from the shift register and a second clock signal from a phase locked loop that provides the high frequency clock.

9. The system of claim 8, wherein the shift register is comprised of one or more toggle flip-flop registers that are initialized by using the duration logic block and the clock waveform parameter signals supplied by the CPS controller.

10. The system of claim 8, further comprising:
- a main clock operating at the nominal processor clock frequency, wherein a period of the high frequency clock is shorter than a second period of the main clock.

11. The system of claim 8, further comprising:
- a main clock, wherein a first waveform resolution of the main clock is half of a second waveform resolution of the high frequency clock.

12. The system of claim 8, wherein the CPS circuit comprises a digital logic circuit that generates respective clock waveforms for each individual instruction of a set of instructions.

13. The system of claim 8, wherein the CPS circuit comprises a digital logic circuit that generates respective clock waveforms for each operational cycle of a processor.

14. The system of claim 8, further comprising:
- a phase-locked loop circuit that generates the high frequency clock.

15. The system of claim 8, wherein the processor is a tensor processor.

16. The system of claim 8, wherein the processor is a graphical processor.

17. A method, comprising:
- decoding instructions supplied from an instruction control unit, the instructions comprising information for controlling generation of clock signals;
- generating clock waveform parameter signals;
- preloading values for a waveform generator that generates waveforms;
- clocking a shift register at a frequency that is higher than a nominal processor clock frequency; and
- supplying a bypass multiplexer with a first clock signal output from the shift register and a second clock signal from a phase locked loop that provides the high frequency clock.

18. The method of claim 17, wherein the shift register comprises one or more toggle flip-flop registers, wherein the method further comprises initializing the one or more toggle flip flop registers, and wherein the initializing comprises using the preloading values and the clock waveform parameter signals.

19. The method of claim 17, further comprising:
- generating respective clock waveforms for each individual instruction of a set of instructions.

20. The method of claim 17, further comprising:
- generating respective clock waveforms for each operational cycle of a processor.

* * * * *